United States Patent [19]
Takayama et al.

[11] Patent Number: 6,163,921
[45] Date of Patent: Dec. 26, 2000

[54] WIPER SYSTEM WITH TRANSLATIONAL MOTION

[75] Inventors: Akira Takayama; Yasuhiko Yoshida; Taizo Kikuchi; Toru Namiki, all of Wako; Takashi Hoshino, Isesaki, all of Japan

[73] Assignee: Mitsuba Corporation, Japan

[21] Appl. No.: 09/256,839

[22] Filed: Feb. 24, 1999

[30] Foreign Application Priority Data

| Feb. 27, 1998 | [JP] | Japan | 10-048013 |
| Feb. 27, 1998 | [JP] | Japan | 10-048021 |
| Feb. 27, 1998 | [JP] | Japan | 10-048050 |
| Mar. 4, 1998 | [JP] | Japan | 10-052386 |

[51] Int. Cl.$^7$ ........................................................ B60S 1/44
[52] U.S. Cl. .................................. 15/250.29; 15/250.16; 15/250.24
[58] Field of Search ..................... 15/250.29, 250.27, 15/250.21, 250.003, 250.002, 250.16, 250.17, 250.24

[56] References Cited

U.S. PATENT DOCUMENTS

| 1,661,388 | 3/1928 | Sather . |
| 3,078,494 | 2/1963 | Price . |
| 3,505,702 | 4/1970 | Omlie et al. . |
| 3,623,182 | 11/1971 | Parker . |
| 3,644,956 | 2/1972 | Parker . |
| 3,649,989 | 3/1972 | Parker . |
| 3,686,706 | 8/1972 | Finley . |
| 5,060,340 | 10/1991 | Grassini ........................ 15/250.24 |

FOREIGN PATENT DOCUMENTS

| 10-48013 | 2/1998 | Japan . |
| 10-48021 | 2/1998 | Japan . |
| 10-48050 | 2/1998 | Japan . |
| 10-52386 | 3/1998 | Japan . |

*Primary Examiner*—Gary K. Graham
*Attorney, Agent, or Firm*—Skjerven Morrill MacPherson LLP; Alan H. MacPherson

[57] ABSTRACT

The wiper system with translational motion is additionally capable of moving the wiper arm in angular motion at an auto stop position so that the wiper blade may be stowed away from the view of the vehicle operator when the wiper system is not in use. The retracted position may be defined immediately below the lower edge of the windshield. When a mist switch is turned on so as to effect a quick wiping action, the wiper arm can angularly move from the retracted position to the upright position. When the wiper arm is already in the translational motion, turning on of the mist switch may increase the speed of the translational motion. To prevent the wiper blade from obstructing the view of the vehicle operator in an intermittent mode, the position of the temporary stop of the wiper blade may be selected at the reversing position which is remote from the vehicle operator. If the interval of the intermittent operation of the wiper arm is relatively short, the position of the temporary stop may then be selected at the auto stop position because the duration of the temporary stop is so short that the obstruction of the view of the vehicle operator is insignificant.

10 Claims, 7 Drawing Sheets

WIPER SYSTEM WITH TRANSLATIONAL MOTION

TECHNICAL FIELD

The present invention relates to a wiper system for wiping off moisture from the surface of a windshield with the lateral translational motion of the wiper blade across the windshield.

BACKGROUND OF THE INVENTION

A wiper system for wiping a windshield of a motor vehicle is desired to be able to wipe as large a surface area of the windshield as possible. However, conventional wiper systems relied on angular motions of wiper arms, and it has not been possible to wipe all the corners of the windshield. Wiper systems with translational motion such as the one disclosed in the U.S. Pat. No. 5,060,340 include a wiper arm which moves laterally across the windshield as a translational motion. Therefore, the wiper blade carried by the wiper arm can cover the substantially entire surface of the substantially rectangular windshield. However, when the wiper system is not operating or when the wiper arm stays stationary for a period of time in an intermittent mode, the wiper arm and the wiper blade inevitably occupies a position near one of the side edges of the windshield in such a manner that the view of the vehicle operator is blocked to a certain extent. Therefore, such wiper systems may be applicable to rear windows of motor vehicles as was the case with the invention disclosed in the U.S. Pat. No. 5,060,340, but may not be acceptable for use on front windshields of motor vehicles.

It may be conceivable to provide a stowing capability to the wiper system to put the wiper arm and the wiper blade out of the view of the vehicle operator when the wiper system is not in use. However, it will require a series of steps which require so much time that the capability of the wiper system to meet the need to quickly respond to the need to wipe the windshield may be impaired. Also, the wiper system with translational motion should be capable of various modes of operation including an intermittent mode and a mist mode for the wiper system to be acceptable for general use.

BRIEF SUMMARY OF THE INVENTION

In view of such problems of the prior art, a primary object of the present invention is to provide a wiper system with translational motion which can wipe a substantially whole surface area of a windshield without substantially blocking the view of the vehicle operator.

A second object of the present invention is to provide a wiper system with translational motion which would not block the view of the vehicle operator, but can quickly respond to the need to wipe the windshield.

A third object of the present invention is to provide a wiper system with translational motion which is properly adapted for an intermittent mode.

A fourth object of the present invention is to provide a wiper system with translational motion which is properly adapted for a mist mode.

According to the present invention, such objects can be accomplished by providing a wiper system with translational motion, comprising: a guide rail extending laterally along a lower edge of a windshield; a carriage guided by the guide rail for lateral movement; a first power actuator for laterally moving the carriage along the guide rail between an auto stop position defined near a first side edge of the windshield on a vehicle operator's side and a reversing position defined near a second side edge of the windshield on a vehicle passenger's side; a wiper arm having a base end pivotally supported by the carriage and a free end carrying a wiper blade for wiping the windshield; and a second power actuator for angularly moving the wiper arm between a retracted position defined along the lower edge of the windshield and an upright position defined substantially vertically on the windshield around the pivotally supported base end thereof.

Thus, the wiper arm can be put out of the view of the vehicle operator by angularly moving it to the retracted position. During the angular movement of the wiper arm from the retracted position to the upright position, the wiper blade attached to it can wipe the surface of the windshield so that the wiper blade can start wiping the windshield substantially without any delay from the retracted state, yet, without blocking the view of the vehicle operator when the wiper system is not in use. In particularly, if the fan shaped surface area of the windshield which is covered by the angular motion of the wiper blade is located immediately in front of the vehicle operator, the wiper system is capable of quickly ensuring the view of the vehicle operator from its retracted state.

If the second power actuator for angularly moving the wiper arm is attached to a fixed part of the vehicle body, it is possible to minimize the mass of the moving parts of the wiper system, and the response speed of the wiper system can be maximized without increasing the power output of the actuator. In this case, the carriage may be provided with a mechanism for converting an output of the second power actuator into an angular motion of the wiper arm. To ensure the stability of the wiper arm during the translational motion of the carriage, the wiper system may be provided with a first locking arrangement for fixedly and selectively securing the wiper arm at the upright position except for when the wiper arm is at the auto stop position. Similarly, to ensure the stability of the carriage during the angular motion of the wiper arm, the wiper system may be provided with a second locking arrangement for fixedly and selectively securing the carriage at the auto stop position when angularly moving the wiper arm.

The wiper system is desired to be provided with the function of intermittent operation. In this case, the wiper system may be provided with a wiper control unit which can cause the wiper blade to come to a temporary stop at the reversing position when an intermittent mode is selected. Because the reversing position is remote from the vehicle operator, the blocking of the view of the vehicle operator during the intermittent mode can be minimized. This is particularly significant when the interval of intermittent operation of the wiper arm is long, and the time duration of the temporary stop of the wiper blade is long enough to annoy the vehicle operator if the wiper blade stays in the view. Conversely, when the interval of intermittent operation of the wiper arm is short, and the time duration of the temporary stop of the wiper blade is therefore not long enough to annoy the vehicle operator, the temporary stop of the wiper blade may occur at the auto stop position so that the wiper blade may quickly start wiping the windshield from the part thereof immediately in front of the vehicle operator.

Also, the wiper system is desired to be provided with a mist switch which can cause an instantaneous motion of the wiper arm of at least one cycle. Such an instantaneously motion may consist of an angular motion of the wiper arm from the retracted position to the upright position or a translational motion of the wiper arm at a high speed. The former is normally the case when the wiper arm is retracted or in the course of the angular motion when the mist switch is turned on, and the wiper arm can immediately secure the view of the vehicle operator through a fan shaped area covered by the wiper blade by such an angular motion of the wiper arm. The latter is normally the case when the wiper arm is in the course of translational motion at low speed. As the use of the mist switch normally means some urgency, it is beneficial to increase the speed of the translation motion.

BRIEF DESCRIPTION OF THE DRAWINGS

Now the present invention is described in the following with reference to the appended drawings, in which.

DETAILED DESCRIPTION OF THE PREFERRED EMBODIMENTS

Figure 1:
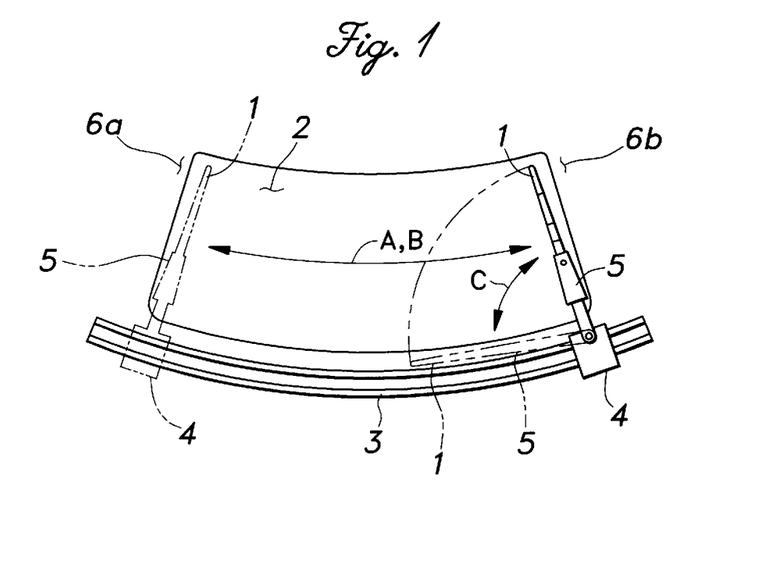
FIG. 1 is a schematic front view of a windshield for showing the manner of operation of a wiper system according to the present invention.
Figure 2:
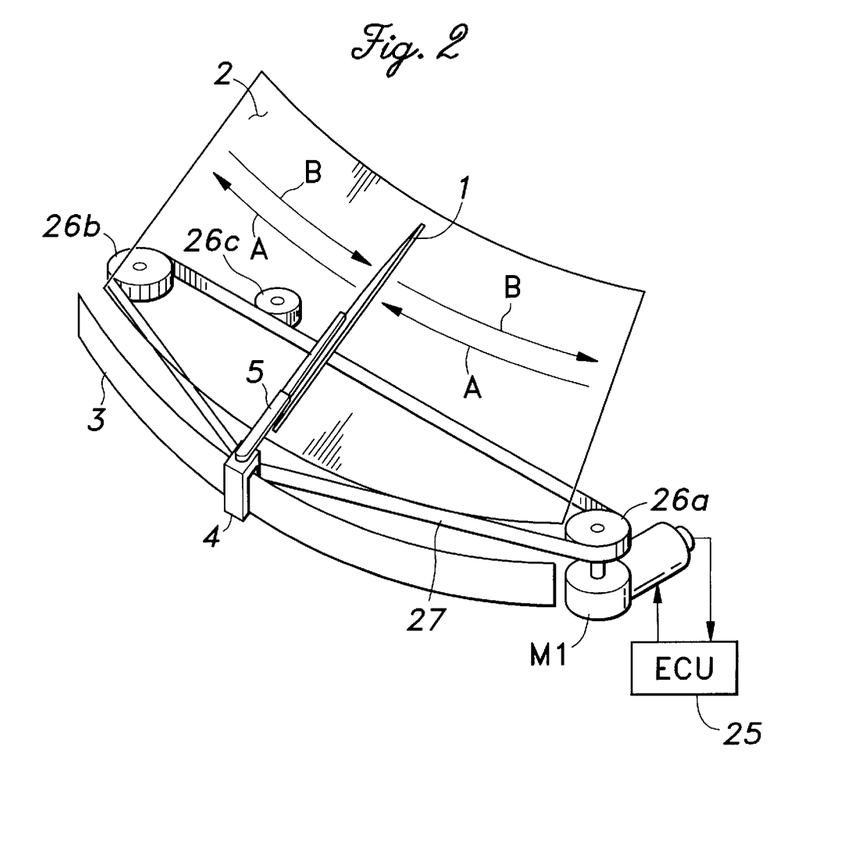
FIG. 2 is a schematic perspective view showing the mechanism for effecting the translational motion of the wiper arm.

FIGS. 1 and 2 schematically illustrate the overall arrangement of a wiper system embodying the present invention, and the basic manner of operation thereof. The wiper system includes a wiper blade 1 which moves laterally across the windshield 2 while maintaining a vertical orientation along the surface of the windshield 2. A carriage 4 is slidably guided on a guide rail 3 extending along the front edge or the lower edge of the windshield 2, and a base end of a wiper arm 5 is integrally supported by the carriage 4. The wiper blade 1 is fixedly carried by the free end of the wiper arm 5. The carriage 4 is actuated by a motor $M_1$ located on one side of the windshield 2 via a cogged belt 27 which is passed around a drive pulley 26a attached to the output shaft of the motor $M_1$, an idle pulley 26b provided in a part of the vehicle body near the other side of the windshield 2, and a tension pulley 26c which is resiliently urged onto the belt 27 so as to maintain a proper tension in the belt 27. Thus, the wiper blade 1 may be reciprocated between right and left front pillars 6a and 6b of the vehicle body with translational motion as indicated by the arrows A and B in FIG. 1. The position of the wiper blade 1 or the wiper arm 5 near the driver's side front pillar 6b may be defined as an auto stop position or a rest position for the translational motion, and the position of the wiper blade 1 or the wiper arm 5 near the passenger's side front pillar 6a may be defined as a reversing position of the wiper arm 5 at which the translation motion of the wiper blade 1 or the wiper arm 5 changes direction.

When the wiping motion is not needed, the wiper blade 1 may be stowed away under the front edge of the windshield 2 as indicated by the arrow C so as not to obstruct the view of the vehicle operator. As the wiper blade 1 is swung into a vertical orientation as indicated by the arrow C from the retracted position as described hereinafter, the wiper blade 1 wipes the surface of the windshield substantially in the same manner as a conventional wiper system. The wiper blade 1 is then placed in parallel with the front pillar 6b on the driver's side, and then reciprocated laterally with translational motion by actuating the carriage 4 as described above.

The illustrated drive mechanism for actuating the carriage 4 is only an example, and other similar mechanisms can also be used. The motor $M_1$ in this case is controlled by an electronic control unit 25, but this is only exemplary, and other possible combinations of electronic control units and mechanical arrangements are all within the purview of the present invention.

The mechanism for effecting the angular motion of the wiper arm 5 is described in the following with reference to FIG. 3. This mechanism comprises a motor $M_2$ fixedly carried by a fixed part of the vehicle body in a substantially vertical orientation and appropriately controlled by the electronic control unit 25, a disk 8 attached to the output shaft of the motor $M_2$ and provided with a cam slot 7 on a lower surface or a surface facing the motor $M_2$, a lever member 11 having a middle part pivotally supported at an end of the guide rail 3 (near the driver's side front pillar 6b of the guide rail 3), and a connecting rod 9 having one end pivotally attached to the disk 8 via a ball joint and another end pivotally attached to one end of the lever member 11. The other end of the lever member 11 is formed as a bifurcated fork portion 10. A sliding rod 14 is slidably guided by a guide member 13 provided in the end portion of the guide rail 3 so as to be slidable in the lengthwise direction of the guide rail 3 as indicated by the arrow F. The slide rod 14 is provided with a pin 12 which is engaged by the fork portion 10 of the lever member 11 so that the rotational motion (indicated by the arrow D) of the motor $M_2$ is converted into the rocking motion (indicated by the arrow E) of the lever member 11 which is in turn converted into the sliding motion (indicated by the arrow F) of the slide rod 14.

Figure 5:
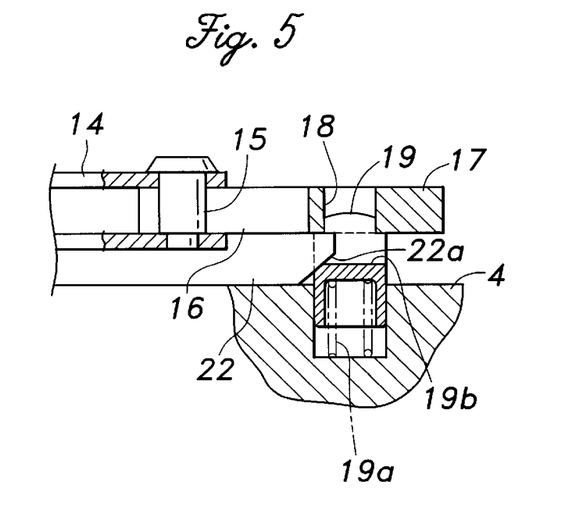
FIG. 5 is a fragmentary sectional view showing the arrangement for selectively securing the wiper arm at the upright position.
Figure 6:
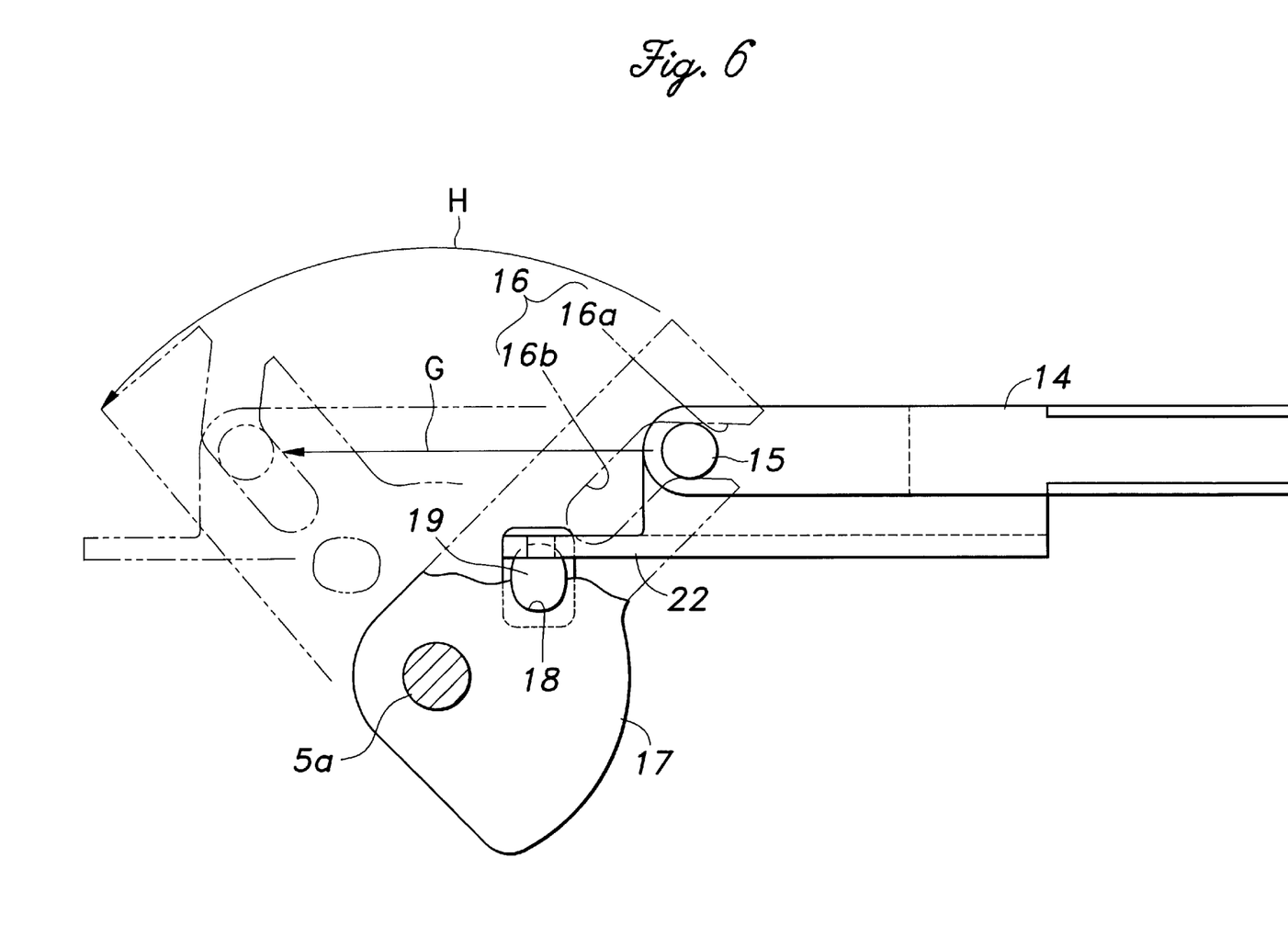
FIG. 6 is a front view of the driven plate which is fixedly attached to the base end of the wiper arm.

A driven plate 17 is integrally attached to the base end of the wiper arm 5 which is pivotally supported by the carriage 4 via a wiper shaft 5a (FIG. 6). Referring also to FIGS. 5 and 6, the driven plate 17 is provided with an open-ended slot 16 which is adapted to receive a pin 15 provided in the corresponding end of the slide rod 14 when the carriage 4 is at the auto stop position. The slot 16 includes a horizontal section 16a which is adapted to freely receive the pin 15 as the rod member 14 advances in the direction indicated by the arrow F in FIG. 3, and an oblique section 16b which connects to the horizontal section 16a at an angle of approximately 135 degrees so as to convert the linear motion of the pin 15 into an angular motion of the driven plate 17 and, hence, an angular motion of the wiper arm 5, as described in more detail hereinafter.

The driven plate 17 is additionally provided with a hole 18 which is adapted to receive a lock pin 19 which is resiliently urged by a compression coil spring 19a into the hole 18. A release rod 22 is integrally attached to the slide rod 14, and is provided with a tapered free end 22a. The lock pin 19 is integrally provided with a shoulder 19b which is adapted to be engaged by the tapered free end 22a of the release rod 22 so as to be selectively pushed out of the hole 18 as the release rod 22 along with the slide rod 14 advances in the direction indicated by the arrow F in FIG. 3.

Figure 3:
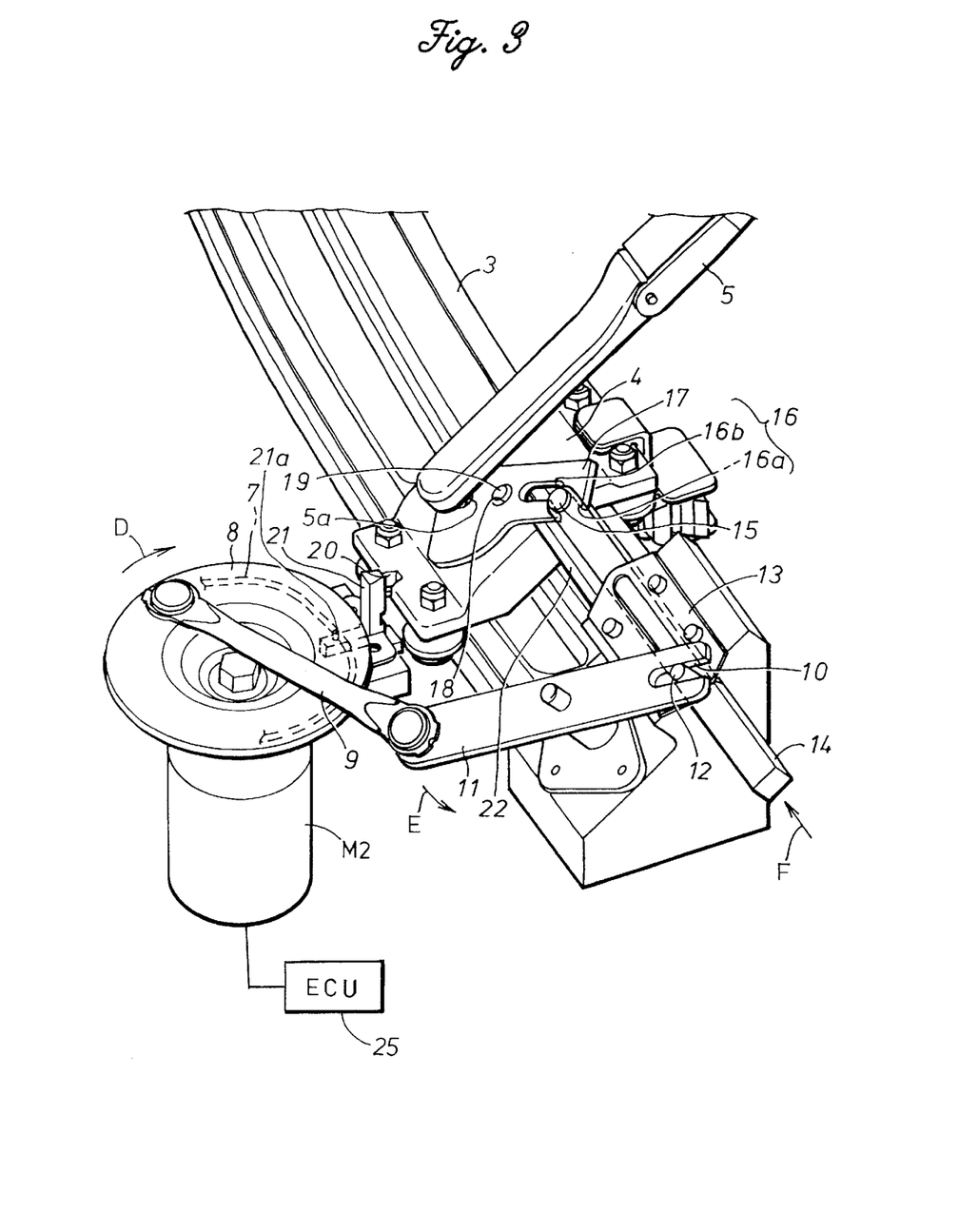
FIG. 3 is a fragmentary perspective view of the mechanism for effecting the angular motion of the wiper arm.
Figure 4:
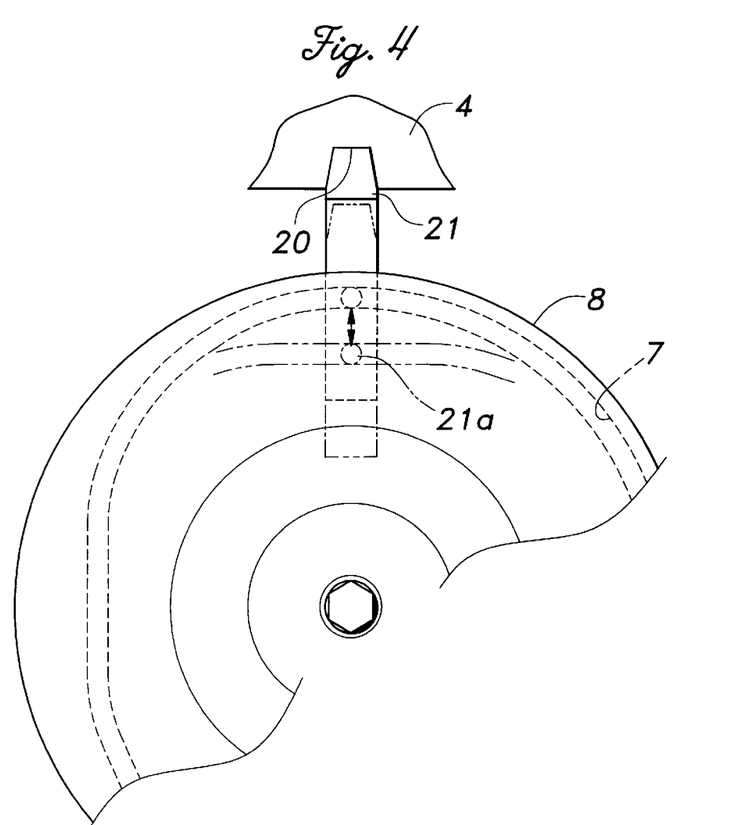
FIG. 4 is a fragmentary front view of the disk attached to the electric motor for the angular motion of the wiper arm and the mechanism for selectively securing the carriage at the auto stop position.

As shown in FIGS. 3 and 4, a stopper member 21 is slidably guided by a fixed part of the vehicle body so as to be selectively fitted into a notch 20 provided in the carriage 4 when the carriage 4 is at the auto stop position. The stopper member 21 is provided with a pin 21a which is received by the cam slot 7 provided in the disk 8 so as to be moved into and out of the notch 20 as the disk 8 is turned by the electric motor $M_2$.

Now the mode of operation of this mechanism for angular motion is described in the following. When the wiper arm 5 undergoes a lateral translational mode, the driven plate 17 is kept rotationally fast with the carriage 4 by the lock pin 19 received in the hole 18, and the slide rod 14 is at a position remote from the carriage 4. The stopper member 20 is at a retracted position, and would not interfere with the lateral motion of the carriage 4. Therefore, the carriage 4, along with the wiper arm 5 and the wiper blade 1, is allowed to undergo a lateral translational motion between the auto stop position and the reversing position.

The wiper arm 5 can be stowed away or brought into the retracted position when the carriage 4 is at the auto stop position. When the carriage 4 reaches the auto stop position, the motor $M_2$ is turned in the direction indicated by an arrow D in FIG. 3, and this causes a counter clockwise rotation of the lever member 11 (arrow E) at the same time as forcing the stopper mechanism 21 into the notch 20 by virtue of the pin 21a received in the cam slot 7. This in turn causes the fork portion 10 to move the slide 14 toward the carriage 4 as indicated by the arrow F. Initially, the pin 15 of the slide rod 14 is received by the horizontal section 16a of the slot 16 without causing any movement to the driven plate 17.

As the slide rod 14 advances further, the pin 15 advances into the oblique section 16b of the slot 16 as indicated by the arrow G in FIG. 6, and engages the edge of the slot so as to cause an angular motion of the wiper arm 5 as indicated by the arrow H in FIG. 6. This retract drive motion is continued until the wiper arm 5 reaches the substantially horizontal retracted or stowed away position which is preferably kept out of the view of the vehicle operator through the windshield 2. This is detected by a limit switch or the like not shown in the drawing, and the motor $M_2$ is stopped if appropriate.

The rise driven or the driving of the wiper arm 5 from the retracted position to the fully risen position can be effected by reversing the motion of the motor $M_2$. Once the wiper arm 5 reaches the fully risen, vertical position, the lock member 21 is moved out of the notch 20, and the lock pin 19 is received in the hole 18 so that the wiper arm 5 is rotationally fast with the carriage 4, and the carriage 4 is now allowed to move laterally along the guide rail 3.

According to this arrangement, the motor $M_2$ for angular motion is not carried by the carriage 4, and the mass of the moving parts can be thereby minimized. This is highly important for achieving a quick response of the wiper arm 5 with minimum power consumption.

Also, this wiper system is provided with various operating modes such as low speed, high speed, intermittent and mist modes. The mist mode is selected when a quick wiping motion is desired when the view through the windshield is suddenly obstructed for instance by water splashes from other vehicles. Also, when a window washer is activated, the wiper arm 5 is required to quickly wipe the windshield as soon as washer liquid is squirted onto the windshield. In such situations, the angular motion of the wiper arm 5 may serve a useful purpose as it will quickly clear the part of the windshield directly opposing the vehicle operator. The above described mechanism is adapted to carry out a single cycle of angular motion with or without involving the lateral translational motion, or even a plurality of cycles of angular motion without involving the lateral translational motion if necessary.

When such a wiper system with translational motion is operated in the mist mode, it is conceivable to raise the wiper blade 1 from the retracted position to the vertical position, and after performing one cycle of lateral translational motion, to swing the wiper blade 1 back into the retracted position. However, this sequence of motion takes a significant time period for completion, particularly when only one wiper blade is used as in the illustrated example. Also, even when the deposition of moisture on the windshield is slight, the wiper blade still performs the full wiping motion, and this may be annoying to the vehicle operator.

In the intermittent mode of a wiper system, the wiper blade (wiper arm) periodically remains stationary for a duration which depends on the intermittent time schedule. In the case of a wiper system involving a translational motion of the wiper blade laterally across the windshield, such a temporary stationary point may be selected at a point near either one of the pillars on both sides of the windshield. However, when the wiper blade (wiper arm) is kept stationary at a point near the pillar on the side of the vehicle operator, the wiper blade which is thus kept stationary near the eyes of the vehicle operator would block the vision of the vehicle operator in combination with the pillars. The illustrated embodiment is designed to address such problems.

This wiper system is provided with a wiper switch which selects the operating modes which include OFF, INT (intermittent mode), LO (low speed continuous mode) and HI (high speed continuous mode), a mist switch for quickly activating the wiper system typically in case of some urgency, and a washer switch for effecting a few cycles of wiping motion at the same time as squirting washing liquid onto the windshield. The INT mode may be additionally provided with the function of selecting the interval of the intermittent operation either in a stepwise fashion or in a continuous fashion.

The following table shows what will happen when the mist switch is turned on for a short time period and a long time period depending on the state of the wiper switch.

TABLE 1

| wiper switch | | OFF | INT | LO | HI |
|---|---|---|---|---|---|
| mist switch | short time | angular | angular or translational*) | translational, from LO to HI | no change |
| | long time | translational and HI | translational and HI | translational, from LO to HI | no change |

*)depends on the position of the wiper arm.

When the wiper switch is OFF, turning on the mist switch for a short time period (for instance when the mist switch is released before the wiper arm reaches the fully upright position), the wiper arm 5 undergoes a single cycle of angular motion. When the mist switch is kept turned on for a longer period of time, the wiper arm proceeds from the angular motion to the translational motion. Because some urgency is typically required under such circumstances, the wiper arm is driven in the high speed (HI) mode.

Figure 7:
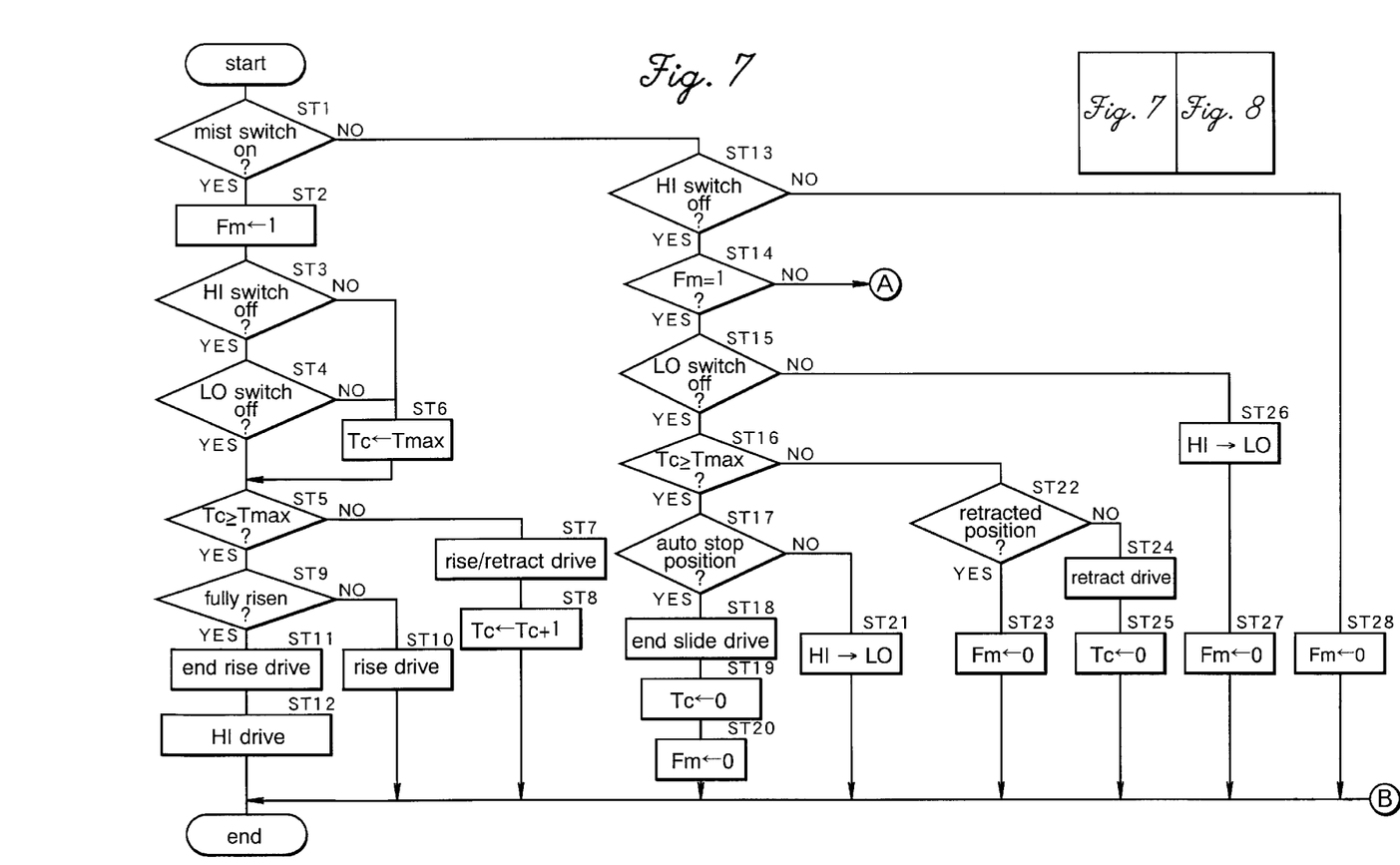
FIGS. 7 and 8 show a flow chart of a control process for the wiper system.
Figure 8:
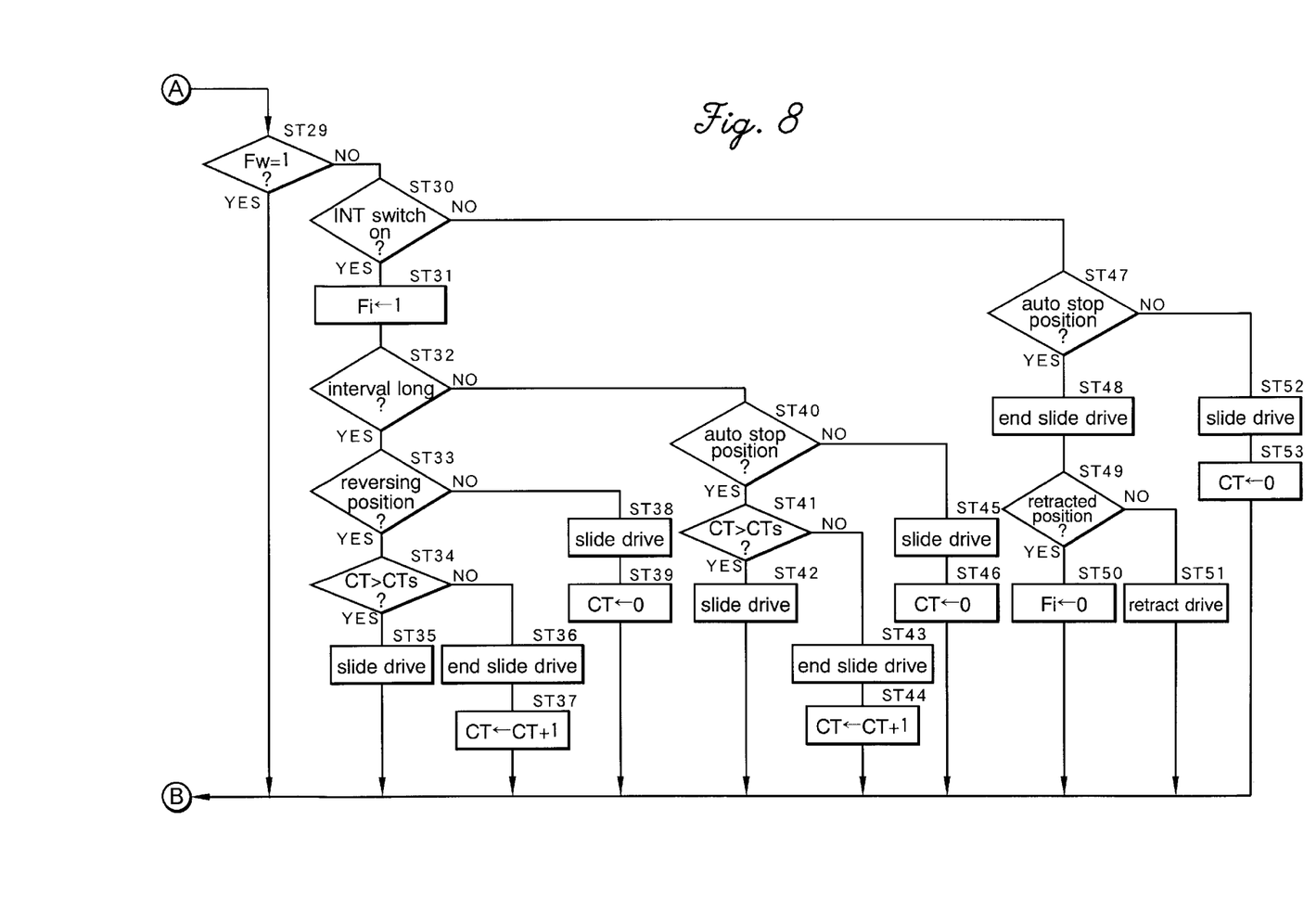

FIGS. 7 and 8 show the flow chart of a control process according to the present invention which favorably controls the motion of the wiper arm (or the wiper blade) when the mist switch is turned on as well as when the intermittent mode is selected. The selection of the various modes is effected by the wiper switch which is not covered by this control flow, but the state of the wiper switch is detected in this control process as required.

In this control flow, first of all, it is determined if the mist switch if ON or not in step ST1. If the mist switch is on in step ST1, the program flow advances to step ST2 where a mist flag Fm is set (Fm=1) before the program flow advances to step ST3. The mist flag is checked in step ST1, and the control flow enters the mist control routine only when it is detected that the mist flag is set (Fm=1). It is determined in step ST3 if the HI switch is off. If the HI switch is off, it means that the wiper switch is either OFF, LO or INT. If the HI switch is not OFF, it means that the wiper switch is HI. If the wiper switch is either OFF, LO or INT, the program flow advances to step ST4. If the wiper switch is HI, a timer Tc for counting the time period of keeping the mist switch on is set to an overflow value (Tmax) in step ST6 before the program flow advances to step ST5. It is determined in step ST4 if the LO switch is off. If the LO switch is OFF, it means that the wiper switch is either OFF or INT. If the LO switch is not OFF, it means that the wiper switch is LO. If the wiper switch is LO, the program flow advances to step ST6. If the wiper switch is either OFF or INT, the program flow advances to step ST5.

In step ST5, it is determined if the count of the timer Tc has exceeded the overflow value Tmax or not. If the value of the timer Tc has not yet exceeded the set value Tmax, or, in other words, if the mist switch has been kept on only for a short period of time in the OFF or INT mode, the program flow advances to step ST7 where, if the wiper arm 5 is being angularly moved as indicated by the arrow C in FIG. 1, the rise/retract mode operation is carried out, and the wiper blade 1 is moved angularly between the risen position (vertical position) and the retracted position (horizontal position) by the motor $M_2$ as indicated by the arrow C in FIG. 1. In any case, once the wiper arm has been driven from the retracted position, the wiper arm 5 necessarily reaches the fully risen position by virtue of a self retaining circuit not shown in the drawings. If the wiper arm 5 is being moved laterally in the INT mode (LO or HI mode cannot be the case here because of steps ST3, ST4 and ST6), step ST7 is merely disregarded and the wiper blade 1 is allowed to continue the translational motion. Following step ST7, the value of the timer Tc is incremented in step ST8, and the program flow returns to the normal control flow.

If it is determined that the value of the inner Tc has exceeded the prescribed value or the overflow value Tmax in step ST5 (in means that either the wiper switch is LO or HI without regard to the length of time period of turning on the mist switch, or the wiper switch is OFF or INT and the mist switch has been kept on for a long period of time), the program flow advances to step ST9 where it is determined if the wiper blade 1 is in the fully risen position and extends in parallel with the driver's side front pillar 6b as indicated by the solid lines in FIG. 1 by using a position sensor or the like. If the wiper blade 1 has not reached the fully risen position, the program flow advances to step ST10 where the wiper blade 1 is allowed to continue to move toward the fully risen position. If the wiper arm 5 has already reached the fully risen position in step ST9, the rise driven is discontinued in step ST11. The wiper arm 5 is then moved laterally with translation motion across the windshield in step ST12 at high speed without regard to the preceding speed. The program flow then returns to the normal control flow.

Keeping the mist switch turned on for a long period of time means some urgency. Therefore, the wiper arm 5 is moved in translational motion laterally across the windshield at high speed so as to wipe the windshield as quickly as possible. Turning on the mist switch in the low speed (LO) mode also means some urgency. Therefore, even when the mist switch has been kept only for a short period of time, the timer Tc is forced to overflow in step ST6 so that the wiper arm 5 is driven at high speed. On the other hand, if the mist switch has been kept turned on only for a short period in either the OFF or INT mode, the following things can occur depending on the current state of the wiper arm. If the wiper arm is in the rise drive motion, the rise/retract drive is continued, and the wiper arm is only allowed to move angularly. If the wiper arm is in the process of translational motion, the translational motion is continued, however, at high speed.

Because the overflow value of the timer Tmax is set shorter than the timer period for the wiper arm to move from the retracted position to the fully risen position, when the program flow has advanced from step ST5 to step ST9, it is possible that the rise drive in still in progress. In such a case, the wiper arm 5 is angularly moved in step ST10, and the program flow returns to the normal control flow.

If it is determined that the mist switch is not turned on in step ST1, the program flow advances to step ST13 wherein it is determined if the HI switch is off. If the HI switch is off, the program flow advances to step ST14 where it is determined if the mist flag has been set (Fm=1). If so, it means that the mist switch was once turned on but has now been turned off. It is then determined in step ST15 if the LO switch is turned off or not. If the LO switch is not turned off, because the mist switch is also OFF, the wiper blade is allowed to continue to move at the low speed until it reaches the retracted position. In other words, the wiper arm continues to move at low speed if the wiper switch is LO, and changes speed from high to low if the wipe speed has been moving at high speed by virtue of the mist switch (step ST26). The mist flag is then reset in step ST27, and the program flow then returns to the normal control flow.

If the LOW switch is off in step ST13, the program flow advances to step ST16 where it is determined if the value of the timer Tc has exceeded the prescribed value Tmax or not. The timer count exceeds the overflow value in step ST16 if the mist switch has been kept turned on for a long period of time, and then turned off in either the OFF or INT mode. In this case, the wiper arm 5 continues to move laterally. In ST17, it is determined if the carriage 4 is at the auto stop position (the reversal point of the lateral motion on the side of the vehicle operator) or not. If the wiper arm 5 is determined to be at the auto stop position, the program flow advances to step ST18. In step ST18, the drive control of the carriage 4 is terminated, and after resetting the value of the timer Tc (Tc=0) in step ST19 and resetting the mist flag in step ST20, the program flow returns to the normal control flow.

If the wiper arm 5 is not determined to be at the auto stop position in step ST17, the program flow advances to step ST21 where the high speed drive control of the carriage 4 is replaced by the low speed drive control, and the program flow returns to the normal control flow. Therefore, the wiper blade 1 would not stop in the middle of the windshield 2, and continues the low speed drive operation until it reaches the auto stop position by virtue of a control process not covered in this disclosure.

If the value of the timer Tc is determined to be less than the prescribed value Tmax (no overflow) in step ST16, as it means that the mist switch has been kept turned on only for a short period of time in either the OFF or INT mode, or the wiper arm has reached the auto stop position and the timer has been reset (steps ST18 and ST19), the wiper arm should be in the angular motion or about to move on to the angular motion. Therefore, the program flow advances to step ST22 where it is determined if the wiper blade 1 (wiper arm 5) is at the retracted position or not. If the wiper blade 1 is determined to be at the retracted position, the program flow advances to step ST23. The mist mode flag Fm is reset (Fm=0) in step ST23, and the program flow returns to the normal control flow.

If the wiper blade 1 is not determined to be at the retracted position in step ST22, the program flow advances to step ST24 where the rise drive motor $M_2$ performs the retract drive control, and angularly moves the wiper arm 5 from the fully risen position to the retracted position as indicated by the arrow C in FIG. 1. Then, the value of the timer Tc is reset in step ST25 (Tc=0), and the program flow returns to the normal control flow.

Thus, if the mist switch is turned on and kept on only for a short period of time, the program flow advances to step ST15 before the time Tc overflows. If the low sped lateral motion has not started at this point, the program flow advances from step ST15 to step ST22 with the result that the wiper arm undergoes a single cycle of angular motion as indicated by the arrow C in FIG. 1. The surface area covered by such an angular motion is limited, but because the covered area is located right in front of the eyes of the vehicle operator, the vehicle operator can obtain an adequate view through the windshield without any delay.

When the deposition of moisture or other matter on the windshield is so significant that the entire surface area is desired to be wiped quickly, the mist switch should be kept turned on for a long period of time. In this case, because the program flow advances from step ST5 to step ST9 when the timer overflows in step ST5, the wiper arm moves laterally across the windshield 2 at high speed following the rise drive motion from the retracted position to the fully risen position so that the entire surface area of the windshield is wiped very quickly.

Thus, according to this part of the control flow, even when a retracted position is defined under the front edge of the windshield, a quick wiping action can be produced by turning on a temporary wiping switch or the mist switch, and angularly moving the wiper blade between the retracted position and the vertical position which is substantially in parallel with the driver's side front pillar. When the mist switch is turned on only for a short time period during the translational motion of the wiper arm, the wiper arm is moved at high speed without regard to the selection on the wiper switch. When the mist switch is kept turned on for a longer period of time, the wiper blade may be made to perform a translational lateral motion so as to achieve a quick wiping action when the moisture deposition on the windshield is significant. Thus, the disclosed embodiment of the present invention allows an optimum quick wiping action depending on the amount of moisture deposition on the windshield.

In the intermittent mode of the wiper system, depending on the selection of the intermittent time, the wiper blade makes a temporary stop at either one of the positions near the right and left front pillars 6a and 6b. The temporary stopping of the wiper arm 5 can be detected by monitoring the carriage 4 with a position sensor. It can also be accomplished in many other ways. For instance, the wiper motor may be fitted with an angular position sensor so that the temporary stop position may be determined from the angular position of the wiper motor which moves with the carriage 4. The part of the flow control described in the following is related to such functions of the wiper system in the intermittent mode.

If the mist mode is not selected (Fm=0) in step ST14, the program flow advances to step ST29 where it is determined if a washer assist flag has been set (Fw=1). When a washer assist mode is selected by turning on the window washer not shown in the drawing so as to effect a prescribed cycles of wiping motion at the same time as squirting washer liquid onto the windshield, the current cycle is concluded. If not (Fw=0), the program flow advances to step ST30.

In step ST30, it is determined if the intermittent mode has been selected on the wiper switch. If the intermittent mode has been selected (intermittent switch on), the program flow advances to step ST31 where an intermittent mode flag is set (Fi=1) before the program flow advances to step ST32. In step ST32, it is determined if the intermittent time period is longer than a threshold time period or not. If the interval of intermittent operation is selected to be longer than a prescribed value, the program flow advances to step ST33. The threshold time period can be freely selected as a threshold value of the time period of the wiper blade remaining stationary at the temporary stop position and thereby blocking the view of the vehicle operator beyond which the vehicle operator finds it annoying. This value is designed to be selected at the time of manufacture in the illustrated embodiment, but may also be designed to be selected by the vehicle operator.

In step ST33, it is determined if the wiper blade 1 is at a reversing position (a point near the pillar 6a on the passenger's side as indicated by the dotted lines in FIG. 1) by using a position sensor or the like. If so, the program flow advances to step ST34. In step ST34, it is determined if the count of an intermittent timer counter CT has reached the prescribed intermittent time period CTs, which is set on the timer counter, or not. If the prescribed intermittent time period CTs has been exceeded, as it means that the time period for the temporary stop has ended, the program flow advances to step ST35 where the wiper blade 1 is made to perform the translational wiping motion, and this concludes the current control cycle leading to step ST35.

If it is not determined that the count of the intermittent timer counter CT has reached the prescribed intermittent time period CTs in step ST34, the program flow advances to step ST36. As it means that the timer has not counted up yet, the translational drive is kept at the stationary state so as to keep the wiper blade stationary at the reversing position. In the following step ST37, the intermittent timer counter CT is incremented, and the current control cycle leading to step ST37 is concluded. Thus, the wiper blade 1 is kept stationary at the reversing position until the count of the intermittent timer counter overflows.

If it is determined that the wiper blade 1 is not at the reversing position in step ST33, the program flow advances to step ST38 where the slide drive is maintained, and the wiper blade continues the wiping motion. In the following step ST39, the intermittent timer counter CT is reset, and the current control cycle leading to step ST39 is concluded.

Thus, when the interval of the intermittent wiping motion is long, the wiper blade 1 is made to make a temporary stop at the reversing position which is remote from the vehicle operator, and therefore would not significantly block the view of the vehicle operator even if the time period of the temporary stop is long.

If it is determined that the interval setting on the intermittent timer counter CT is relatively short (or the value of CTs is relatively small) in step ST32, the program flow advances to step ST40 where it is determined if the wiper blade 1 is at the auto stop position (the point near the front pillar 6b on the driver's side). If the wiper blade 1 is determined to be at the auto stop position in step ST40, the program flow advances to step ST41. It is determined in step ST41 if the count on the intermittent timer counter CT has exceeded the prescribed intermittent time period CTS or not. If so, as it means that the time period for the temporary stop given as the intermittent time period has ended, the program flow advances to step ST42 where the translational device is started, and the wiper blade begins the wiping motion. Thereby, the current control cycle leading to step ST42 is concluded.

If it is determined in step ST41 that the count on the intermittent timer counter CT has not exceeded the prescribed intermittent time period CTs, the program flow advances to step ST43. In this case, as the timer has not counted up the slide drive is set to the stationary state in step ST43 to keep the wiper blade 1 stationary at the auto stop position, and the intermittent timer counter is incremented in the following step ST44, thereby concluding the current control cycle leading to step ST44.

If it is determined in step ST40 that the wiper blade 1 is not at the auto stop position, the program flow advances to step ST45 where the translational drive is maintained, and the wiper blade continues the wiping motion. In the following step ST46, the intermittent timer counter CT is reset, and the control cycle leading to step ST46 is concluded.

Therefore, when the prescribed intermittent time period CTs is relatively short, the wiper blade 1 makes a temporary stop at the auto stop position. If the time duration of the temporary stop is short, as it means the amount of rainfall is significant, it is desirable to wipe the windshield 2 from the vehicle operator's side so that the view of the vehicle operator may be quickly ensured. Therefore, according to this embodiment, the wiper blade 1 is caused to make a temporary stop at a point near the front pillar 6b on the vehicle operator's side in such a case. This would not annoy the vehicle operator because the time duration of blocking the vehicle operator's view (or the time duration of the temporary stop) is so short.

If the intermittent mode is not selected on the wiper switch (intermittent switch off) in step ST30, the program flow advances to step ST47 where it is determined if the wiper blade 1 is at the auto stop position or not. If the wiper blade is at the auto stop position in step ST47, the program flow advances to step ST48. The slide drive is discontinued in step ST48, and it is determined in the following step ST49 if the wiper blade 1 is in the retracted position or not. The retracted state of the wiper blade can be also detected with a position sensor or the like.

If it is determined in ST49 that the wiper blade 1 is in the retracted position, the program flow advances to step ST50 where the intermittent mode flag is reset (Fi=1), and the current control cycle leading to step ST50 is concluded. If it is determined in ST49 that the wiper blade 1 is not in the retracted position, the program flow advances to step ST51 where the retract drive control is performed so as to stow away the wiper blade 1 in the retracted position.

If it is determined in step ST47 that the wiper blade has not reached the auto stop position, the program flow advances to step ST52 where the slide drive control is maintained, and the translational wiping motion is continued. The intermittent timer counter CT is reset in the following step ST53, and the control cycle leading to step ST53 is concluded. Thus, once the intermittent switch is turned off, the translational motion is maintained only until the wiper blade 1 reaches the auto stop position, and the wiper arm 5 is thereafter retracted from the auto stop position to the retracted position.

Figure 9:
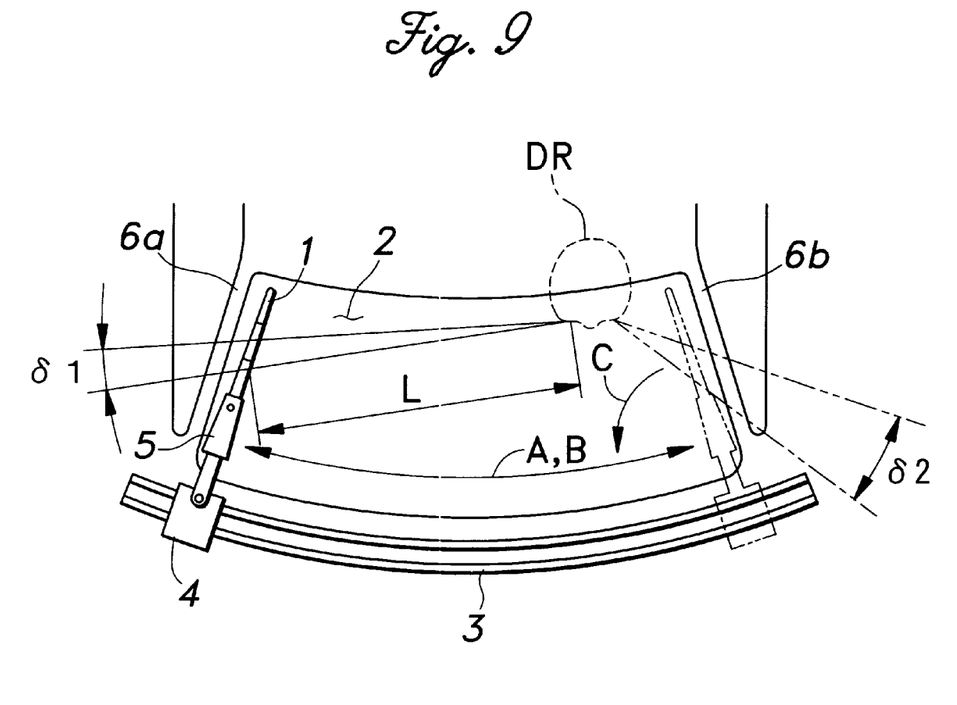
FIG. 9 is a view similar to FIG. 1 showing how the wiper blade could obstruct the view of the vehicle operator depending on the position of the temporary stop of the wiper arm.

When the wiper blade is kept stationary at the temporary stop position in the intermittent mode of the wiper system with translational motion, if the intermittent time period is long and the time duration of remaining in the stationary position is significant, the wiper blade 1 is kept stationary at the position near the front pillar 6a on the passenger's side which is furthest away from the vehicle operator DR as indicated in FIG. 9. In this case, the distance L from the eyes of the vehicle operator DR to the wiper blade 1 is so large that the dead angle $\delta 1$ can be minimized. This dead angle $\delta 1$ is substantially smaller than the dead angle $\delta 2$ which is produced when the wiper blade 1 is kept stationary at the point near the front pillar 6b on the vehicle operator's side as indicated by the imaginary lines in FIG. 9 so that the obstruction of the view is minimized, and the vehicle operator DR would not be annoyed even when the duration of the temporary stopping of the wiper blade in the intermittent mode is relatively long.

According to the present invention, it is possible to select the angular motion and the translational motion of the wiper arm so as to best meet the need. As a possible variation of the present invention, it is possible to define a mode under which the wiper arm is made to repeat the angular motion, for instance, at high speed so as to ensure the view through the part of the windshield right ahead of the vehicle operator even when there is a heavy rainfall.

Although the present invention has been described in terms of a preferred embodiment thereof, it is obvious to a person skilled in the art that various alterations and modifications are possible without departing from the scope of the present invention which is set forth in the appended claims.

What is claimed is:

1. A wiper system with translation motion, comprising:
   a guide rail extending laterally along a lower edge of a windshield;
   a carriage guided by said guide rail for lateral movement;
   a first power actuator for laterally moving said carriage along said guide rail between an auto stop position defined near a first side edge of said windshield on a vehicle operator's side and a reversing position defined near a second side edge of said windshield on a vehicle passenger's side;
   a wiper arm having a base end pivotally supported by said carriage and a free end carrying a wiper blade for wiping said windshield; and
   a second power actuator for angularly moving said wiper arm between a retracted position defined along said lower edge of said windshield and an upright position defined substantially vertically on said windshield around said pivotally supported base end thereof.

2. A wiper system according to claim 1, wherein said second power actuator for angularly moving said wiper arm is attached to a fixed part of a vehicle body, and said carriage is provided with a mechanism for converting an output of said second power actuator into an angular motion of said wiper arm.

3. A wiper system according to claim 2, further comprising a first locking arrangement for fixedly and selectively securing said wiper arm at said upright position except for when said wiper arm is at said auto stop position.

4. A wiper system according to claim 2, further comprising a second locking arrangement for fixedly and selectively securing said carriage at said auto stop position when angularly moving said wiper arm.

5. A wiper system according to claim 1, further comprising a wiper control unit which can cause said wiper blade to come to a temporary stop at said reversing position when an intermittent mode is selected.

6. A wiper system according to claim 5, wherein the wiper control unit is adapted to cause said wiper blade to come to a temporary stop at said reversing position when an intermittent mode is selected and an interval of intermittent operation of said wiper arm is longer than a prescribed value.

7. A wiper system according to claim 6, wherein the wiper control unit is adapted to cause said wiper blade to come to a temporary stop at said auto stop position when an intermittent mode is selected and an interval of intermittent operation of said wiper arm is shorter than a prescribed value.

8. A wiper system according to claim 1, further comprising a wiper control unit and a mist switch associated therewith so as to selectively effect an instantaneous motion of said wiper arm.

9. A wiper system according to claim 8, wherein said instantaneous motion includes an angular motion of said wiper arm from said retracted position to said upright position.

10. A wiper system according to claim 8, wherein said instantaneous motion includes a translational motion of said wiper arm at a higher speed.

* * * * *